United States Patent [19]

Robinson

[11] 4,077,929

[45] Mar. 7, 1978

[54] PROCESS FOR PRODUCING FLAME-RESISTANT FILAMENTS

[75] Inventor: Larry Grant Robinson, Camden, S.C.

[73] Assignee: E. I. Du Pont de Nemours and Company, Wilmington, Del.

[21] Appl. No.: 555,995

[22] Filed: Mar. 6, 1975

[51] Int. Cl.$^2$ ............................................. C08L 35/04
[52] U.S. Cl. .................... 260/29.6 AQ; 260/29.6 AN; 260/28.5 D; 260/28.5 R; 260/32.6 N; 260/45.7 R; 260/45.7 P; 260/45.7 PH; 264/182
[58] Field of Search ............... 260/29.6 AN, 29.6 AQ, 260/32.6 N, 45.7 R, 45.7 PH, 45.7 P, 28.5 D, 28.5 R; 264/182

[56] References Cited

U.S. PATENT DOCUMENTS

| 2,456,231 | 12/1948 | Wiley | 260/78.5 |
| 2,878,227 | 3/1959 | Ucci | 260/32.6 |
| 2,878,229 | 3/1959 | Jenkins | 260/32.6 |
| 3,055,861 | 9/1962 | Hersh | 260/45.7 |
| 3,748,302 | 7/1973 | Jones | 260/42.44 |

FOREIGN PATENT DOCUMENTS

| 4,729,930 | 8/1972 | Japan. |
| 4,539,056 | 12/1970 | Japan. |

*Primary Examiner*—Melvin I. Marquis

[57] ABSTRACT

A process for producing flame-resistant filaments by preparing a hot solution of a halogen-containing acrylonitrile polymer composition in an inert organic solvent for the composition, extruding the solution to form filaments and removing the solvent from the filaments. Corrosive attack of the solution on metallic equipment used in the process is greatly reduced by incorporating both water and specified phosphorus compounds in the solution.

14 Claims, No Drawings

PROCESS FOR PRODUCING FLAME-RESISTANT FILAMENTS

This invention relates to solutions of acrylonitrile polymer compositions containing halogen bonded to saturated carbon for spinning flame-resistant fibers. More particularly, it relates to such solutions which have a greatly reduced tendency to corrode the metallic extrusion equipment.

Fibers of acrylonitrile polymer compositions containing halogen have been employed to replace the conventional, more flammable acrylic fibers for many end uses in response to the increasing interest in flame-resistant materials. Examples of such compositions include acrylonitrile/vinyl chloride copolymers and mixtures of acrylonitrile polymers with tris(2,3-dibromopropyl) phosphate. In the United States and some other countries, children's sleepwear is now required by law to be flame resistant.

Various stability problems have been encountered as the result of preparing and spinning hot solutions in organic solvents of acrylonitrile polymer compositions containing halogen bonded to saturated carbon. The hot solutions are subject to discoloration and gelation. An especially troublesome problem is that the stainless steel and other metals of which the polymer solution and extrusion equipment, e.g., pack screens and spinnerets, are comprised are rapidly corroded by these hot solutions.

SUMMARY OF THE INVENTION

The present invention relates to production of flame-resistant filaments by preparing a hot solution of a halogen-containing acrylonitrile polymer composition in an inert organic solvent for the composition, extruding the solution to form filaments and removing the solvent from the filaments. The improvements of the present invention provides for modification of the solution to greatly reduce corrosive effects of the solution on metallic equipment used in the process, e.g., stainless steel dissolving and extrusion equipment.

In accordance with the present invention water and a phosphorus compound are included in the hot solution of halogen-containing acrylonitrile polymer composition in inert organic solvent. The phosphorus compound is phosphoric acid, or phosphorous acid, or a triorgano phosphite compound consisting of carbon, hydrogen, oxygen and phosphorus. The amount of water should be 1 to 10 percent by weight (preferably about 2 to 5) based on the weight of inert organic solvent plus water. The amount of phosphorus compound should be 0.005 to 0.1 (preferably about 0.02 to 0.03) mole per kilogram of polymer in the composition.

The halogen-containing acrylonitrile polymer composition preferably contains at least 40 weight percent of polymerized acrylonitrile monomer units and at least 3 (preferably at least 10) weight percent halogen in the form of polymerized vinyl halide monomer, e.g., vinyl chloride. Alternatively, the composition may be a mixture of acrylonitrile polymer and a halogen-containing organic compound wherein the halogen is bonded to saturated carbon, e.g., tris(2,3-dibromopropyl)phosphate or a chlorinated aliphatic hydrocarbon. Preferred solvents are dimethylformamide and dimethylacetamide.

The water and phosphorus compound may be added to the solvent before the acrylonitrile polymer composition is added, or they may be added to the solution of acrylonitrile polymer composition in inert organic solvent. Preferred phosphorus compounds are phosphoric acid, phosphorous acid, tris-(dipropylene glycol)-phosphite, triisooctyl phosphite and triphenyl phosphite.

Surprisingly, the rate of corrosion of stainless steel by solutions prepared in accordance with the invention is as much as a hundredfold lower than the rate of corrosion experienced with solutions containing no water or phosphorus compound. The water and the phosphorus compound have a synergistic effect upon one another in reducing corrosion. In the absence of water, corrosion is at best reduced slightly by adding a phosphorus compound to the solution of the flame-resistant polymer. In the absence of the phosphorus compound, corrosion is reduced moderately by adding water to the solution; but up to a 20-fold additional reduction is achieved by adding the phosphorus compound along with the water.

DESCRIPTION OF THE INVENTION

The acrylonitrile polymer compositions to which the process of the present invention are applicable are compositions containing at least 40 weight percent polymerized acrylonitrile monomer units and at least 3 (preferably at least 10) weight percent halogen, particularly chlorine or bromine. The composition may be a halogen-containing acrylonitrile polymer in which the halogen is bonded directly to the polymer chain, or it may be a mixture of an acrylonitrile polymer with a halogen-containing organic compound. In either case the present invention is concerned with compositions containing halogen bonded directly to saturated carbon, i.e. the halogen atom is bonded directly to a carbon atom which is also bonded directly to three other atoms.

The halogen-containing acrylonitrile polymer composition preferably contains at least 40 weight percent acrylonitrile monomer units and at least 3 (preferably at least 10) weight percent halogen, preferably chlorine or bromine, in the form of vinyl or vinylidene halide monomer units or mixtures thereof, e.g. vinyl chloride, vinyl bromide, or vinylidene chloride. The halogen-containing acrylonitrile polymer may include additional monomer units such as styrene, methyl acrylate, methyl methacrylate, and vinyl acetate. Sulfonate-containing monomers may also be present, preferably in small amounts to impart improved dyeability. In a highly preferred embodiment, the polymer comprises at least 40 weight percent acrylonitrile, at least 10 weight percent halogen in the form of vinyl chloride, vinyl bromide, and/or vinylidene chloride, and about 1 or 2 weight percent of a sulfonate-containing monomer. The monomers should be essentially linear, since non-linear polymers (i.e., cross-linked polymers) are generally not soluble.

Specific instances of polymers to which the process of the present invention is applicable are given by Jones in the examples of his U.S. Pat. No. 3,748,302. These preferred polymers include acrylonitrile/vinylidene chloride/sodium styrenesulfonate terpolymer in the ratio of about 75/24/1 by weight, acrylonitrile/vinyl bromide/sodium styrenesulfonate terpolymer in the ratio of about 83/16/1 by weight, and acrylonitrile/vinyl chloride/sodium styrenesulfonate terpolymer in the ratio of about 74/25/1 by weight. Other preferred polymers include acrylonitrile/vinyl chloride/2-acrylamido-2-methylpropanesulfonic acid terpolymer in the ratio of about 69/30/1 by weight, prepared as described by LaCombe et al. in Canadian Patent 704,778; as well as the analogous terpolymer in sodium salt form, acrylonitrile/vinyl chloride/sodium-2-methacrylamido-2-methylpropanesulfonate terpolymer in the ratio of about 68/30.5/1.5 by weight; and the analogous tertiary amine salt, acrylonitrile/vinyl chloride/triamylammonium 2-acrylamido-2-methylpropanesulfonate terpolymer in the ratio of 65/33/2.

Acrylonitrile polymers containing no halogen may also be mixed with halogen-containing organic compounds in accordance with the present invention. The preferred acrylonitrile polymers for such mixtures are those which contain at least 85% acrylonitrile monomer units and which may include additional monomer units such as those listed above, e.g., styrene. The halogen-containing organic compound is added in such amount that the composition contains at least 3 (preferably at least 10) weight percent halogen, the proportion of acrylonitrile polymer being high enough that the composition contains at least 40 weight percent acrylonitrile monomer units. Suitable halogen-containing organic compounds include chlorinated aliphatic hydrocarbons, preferably containing over 50 weight percent chlorine (for instance, "Unichlor 70AX", a product of the Neville Chemical Co., Pittsburgh, Pa., and "Chlorowax 500C", a product of the Diamond Shamrock Chemical Co., Cleveland, Ohio). Other suitable halogen-containing organic compounds include the haloalkyl phosphates, such as tris-chloroethyl phosphate, tris-bromoethyl phosphate, tris-(2,3-dichloropropyl)phosphate, and tris(2,3-dibromopropyl) phosphate. These halogen-containing organic compounds are characterized by the presence of halogen bonded to saturated carbon and are effective in imparting flame resistance to acrylonitrile polymer compositions when added in sufficient amounts; however, they also tend to corrode the spinning equipment unless inhibited in accordance with the present invention.

Of course, the halogen may be present both in the acrylonitrile polymer molecule and in a halogen-containing organic compound added to the polymer.

In accordance with the invention, the acrylonitrile polymer composition is dissolved in a solvent mixture comprising 1-10% by weight of water, the remainder being an inert organic solvent. Any inert organic solvent suitable for dissolving the acrylonitrile polymer composition in the presence of the desired amount of water may be used. As employed herein, the term "inert organic solvent" refers to any solvent which will not react with the acrylonitrile polymer composition, the phosphorus compound, or other additives such as antimony oxide or zinc oxide which may be incorporated in the mixture. Since the solubility of the polymers vary in accordance with their composition, a solvent which is effective for one polymer may not be effective for another polymer. Preferred solvents are dimethylformamide and dimethylacetamide, because they are good solvents for a wide range of polymers. Other examples include dimethylsulfoxide and butyrolactone. The solution preferably contains about 30 to 42% by weight of the halogen-containing acrylonitrile polymer composition.

The solution of the acrylonitrile polymer composition in the solvent is carried out in conventional manner by stirring the acrylonitrile polymer into the solvent. The water, phosphorus compound, and halogen-containing organic compound (if one is used) may be added to the solvent before or after the polymer is stirred into the solvent. A considerable degree of heating is usually engendered by mechanical agitation, and an external source of heat may be employed if heating to a higher temperature is desired. Other materials desired to be added may also be incorporated in the mixture at this time.

The phosphorus compound may be phosphoric acid, phosphorous acid, or a triorgano phosphite compound. The triorgano phosphite compound employed in the present invention can be represented by the formula

wherein R, R', and R" are the same or different monovalent organic radicals, with the proviso that R' and R" may be joined (with elimination of hydrogen atoms) to form a divalent organic radical. Preferred monovalent organic radicals are the hydrocarbyl and oxyhydrocarbyl radicals. Triorgano phosphite compounds suitable for use in the present invention include triethyl phosphite, tributyl phosphite, triisooctyl phosphite, tridodecyl phosphite, diphenyl ethyl phosphite, dibutyl phenyl phosphite, triphenyl phosphite, and tris-[3-(3-hydroxypropoxy)propyl] phosphite, the latter also called tris-(dipropylene glycol) phosphite. Also suitable are the phosphites in which R' + R" = ethylene and R = phenyl or hydroxyethoxy, designated as 2-phenyl-1,3,2-dioxaphospholane and 2-(2-hydroxyethoxy)-1,3,2-dioxaphospholane, respectively.

Triorgano phosphate compounds, used either alone or in combination with water, are ineffective in reducing the corrosive effects of the halogen-containing acrylonitrile polymer compositions. The outstanding effectiveness of water used in combination with phosphoric acid, phosphorous acid, or a triorgano phosphite compound, is thus particularly surprising.

If desired, titanim oxide may be incorporated in the spinning solution as a delusterant. Antimony oxide in the amount of about 3% by weight (based on polymer) may be added to enhance the flame resistance of the halogen-containing acrylonitrile polymer composition. Zinc oxide may also be included to reduce the color of the solution and, when antimony oxide is incorporated, to prevent or retard a reduction reaction which causes deposition of metallic antimony on the surfaces of the extrusion equipment. Other additives may also be incorporated in the spinning solution.

Approximately 0.025 mole of the phosphorus compound per kilogram of the polymer is usually optimum for minimizing corrosion. Correspondingly, a solvent mixture comprising 95% of the inert organic solvent and 5% water is usually optimum for minimizing corrosion. When the amount of phosphorus compound is reduced below 0.005 mole per kilogram of the polymer, or when the amount of water in the solvent mixture is reduced to below 1% by weight, the corrosive effect of the solution on stainless steel increases to an undesired extent. No further improvement in inhibiting corrosion is noted when the amount of the phosphorus compound is increased above 0.1 mole per kilogram of polymer; however, gelation of the polymer solution frequently becomes a problem above this level. Solvent mixtures containing more than about 10% water similarly show to improvement in corrosion over those containing only 5% water, and gelation of the polymer solution is also a problem when more than 10% water is present.

An unexpected advantage of the process of the present invention is that, when the water and the phosphorus compound are present in the solution in their optimum amounts, the tendency of the solution to gel is reduced as compared with solutions containing no water or phosphorus compound. This effect is observed even when antimony oxide is incorporated in the solution to enhance the flame resistance of the halogen-containing acrylonitrile polymer composition. The effect is even more marked when no antimony oxide is present. For best results the concentration of water should be about 5% and the concentration of the phosphorus compound should be about 0.025 mole per kilogram of polymer. When considerably higher amounts of water or phosphorus compound are used, the tendency towards gelation is not decreased as much, and at very high concentrations of the water and phosphorus compound the tendency towards gelation may even be greater than that observed in solutions containing no water or phosphorus compound. A considerable improvement in the color of the spinning solution is also observed when water and phosphorus compound are added to the solution in accordance with the present invention.

The following examples are provided to illustrate the invention. All parts and percentages are expressed on a weight basis unless otherwise indicated.

EXAMPLE I

The corrosive effects of various solutions of chlorine-containing modacrylic polymer on stainless steel coupons is measured in this example.

The coupons employed in the experiment are comprised of stainless steel containing 19% chromium and 9% nickel (SS-304 stainless steel) and have a total surface area of about 3.5 in.$^2$, measuring approximately 2 inches $\times$ ¾ inch $\times$ ⅛ inch, with a hole measuring approximately ⅜ inch in diameter in the center. The coupons are prepared for the test by scrubbing them with a toothbrush, using a commercially available household cleansing powder and water. After the coupons have been scrubbed they are rinsed with water, dried with a paper towel, rinsed with acetone, and finally dried in air. The coupons are then weighed on a balance to a tenth of a milligram. Repetition of the cleaning procedure on a previously cleaned, weighed coupon results in a weight loss of 0.0001 g., within the limit of weighing error of the balance. A series of three repetitions of the cleaning procedure on two previously cleaned, weighed coupons results in weight losses of 0.0004 g. and 0.0006 g., respectively. A string made of an aromatic polyamide is tied to each coupon so that it can be suspended in a test tube.

In a series of experiments, quantities of about 100-130 gm. of the terpolymer of acrylonitrile (65%), vinyl chloride (33%), and the triamylamine salt of 2-acrylamido-2-methylpropanesulfonic acid (2%) are made up in a series of solutions containing about 38% of the polymer. The solvent system used in each experiment, together with the concentration of any water or phosphorus compounds incorporated and the weight percentage (based on polymer) of any antimony oxide or zinc oxide incorporated, is listed in Table I. The solutions are prepared by adding the polymer and additives to the solvent in an open vessel and stirring until the solution is well mixed and warm enough to pour easily. Each solution is poured to a depth of 7 inches in a glass test tube having a height of 15 inches and a diameter of 1.5 inches. A stopper is placed in the top of each test tube, after which the tube is immersed in an oil bath to a depth of 7 inches. The oil bath is maintained at a temperature of 120°$\pm$0.5° C. by a controller and two heating coils, the oil bath being continuously stirred. After the test tube has been in the oil bath for 30 minutes, a stainless steel coupon prepared as described above is lowered to the bottom of the test tube, suspended by the polyamide thread. The coupons are permitted to remain in the hot solution in the test tubes for 48 hours, after which they are removed and polymer solution is stripped away from the coupons, carefully removing any polymer adhering to the coupon by mechanical scraping. After polymer removal the coupons are prepared for weighing by scrubbing and washing them again as described above. The scrubbing is continued until the dark corrosion layer covering the coupons is removed.

Listed in Table I is the loss in weight of the coupon in each test, together with the corrosion rate in mils per year. Average results are given for tests repeated under identical conditions. The equation for corrosion rate is $$\text{mil/yr.} = \frac{(\text{wt. loss in mg.}) \times 534}{(\text{area in in.}^2) \times (\text{time in hr.}) \times (\text{density})}$$

In the procedure used in this test, the area of the coupons is taken to be 3.5 in.$^2$, the time is 48 hr., and the density of the SS 304 is 8.02. The equation therefore simplifies to the following formula, which is used to calculate the corrosion rate results for a 48-hour test:

$$\text{mil./yr.}_{SS\ 304} = 0.396\ (\text{wt. loss in mg.})$$

In Table I, entries marked with an asterisk exemplify the practice of the present invention, while the entries which are not so marked represent comparative experiments.

EXAMPLE II

The corrosive effects of solutions of an acrylonitrile copolymer to which halogen-containing compounds have been added is measured in this example.

In a series of experiments, quantities of 80 g. of the terpolymer of acrylonitrile (94%), methyl acrylate (5.7%), and sodium styrenesulfonate (0.3%) are made up with 20 g. of tris(2,3-dibromopropyl) phosphate in solutions with about 179 g. of solvent. In another series of experiments, quantities of 75 g. of the terpolymer and 25 g. of a chlorinated aliphatic hydrocarbon having a molecular weight of 1050 and containing 70% chlorine by weight ("Unichlor 70AX") are made up in solutions with about 187 g. of solvent. The solvent system used in each experiment, together with the concentration of any water or phosphorus compounds incorporated, is listed in Table II. The solutions are prepared and their corrosion rate upon stainless steel coupons are measured as described in Example I. Listed in Table II is the loss in weight of the coupon in each test, together with the corrosion rate in mils per year, calculated as in Example I. As in Table I, only those entries in Table II which are marked with an asterisk exemplify the practice of the present invention.

Abbreviations employed in Tables I and II are as follows:

AN = acrylonitrile
MA = methyl acrylate
VCl = vinyl chloride
SSS = sodium styrenesulfonate
AMPS = 2-acrylamido-2-methylpropanesulfonic acid
TAA = triamylamine (salt)
DMF = dimethylformamide
DMAc = dimethylacetamide
DPGP = tris-(dipropylene glycol) phosphite
TIOP = triisooctyl phosphite
$(C_6H_5)_3PO_3$ = triphenyl phosphite
$(C_6H_5)_3PO_4$ = triphenyl phosphate
$H_3PO_3$ = phosphorous acid
$H_3PO_4$ = phosphoric acid
ClAH = chlorinated aliphatic hydrocarbon
TBP = tris(2,3-dibromopropyl) phosphate TABLE I
CORROSION RATE OF SS 304 BY SOLUTIONS OF AN/VCl/AMPS - TAA TERPOLYMER

| | Solvent Mixture | | | Phosphorus Compound | | Other Additives | No. of Tests | Coupon wt. loss mg. | Rate in mil./yr. |
|---|---|---|---|---|---|---|---|---|---|
| | | | | Amount Added mole/kg. polymer | Compound | | | | |
| 1. | DMF/H$_2$O | — | 100/0 | — | — | — | 3 | 59.3 | 23.5 |
| 2. | " | — | " | 0.023 | DPGP | — | 2 | 39.9 | 15.8 |
| 3. | " | — | 95/5 | — | — | — | 3 | 14.8 | 5.8 |
| *4. | " | — | " | 0.023 | DPGP | — | 3 | 0.5 | 0.2 |
| 5. | " | — | 100/0 | 0.023 | TIOP | — | 1 | 76.8 | 30.4 |
| *6. | " | — | 95/5 | " | " | — | 1 | 0.7 | 0.3 |
| 7. | " | — | 100/0 | 0.023 | (C$_6$H$_5$)$_3$PO$_3$ | — | 1 | 51.4 | 20.3 |
| *8. | " | — | 95/5 | " | " | — | 1 | 0.5 | 0.2 |
| 9. | DMAc/H$_2$O | — | 100/0 | — | — | — | 2 | 181.7 | 71.9 |
| *10. | " | — | 95/5 | 0.023 | DPGP | — | 1 | 3.9 | 1.5 |
| *11. | DMF/H$_2$O | — | 97.5/2.5 | " | " | — | 1 | 3.9 | 1.5 |
| *12. | " | — | 90/10 | " | " | — | 1 | 2.1 | 0.8 |
| *13. | " | — | 95/5 | 0.0115 | " | — | 1 | 1.6 | 0.6 |
| *14. | " | — | " | 0.046 | " | — | 1 | 1.0 | 0.4 |
| 15. | " | — | " | — | — | 3% Sb$_2$O$_3$ | 1 | 83.3 | 33.0 |
| *16. | " | — | " | 0.023 | DPGP | 3% Sb$_2$O$_3$ | 1 | 0.3 | 0.1 |
| *17. | " | — | " | " | " | 3% Sb$_2$O$_3$ 0.5% ZnO | 1 | 0.7 | 0.3 |
| 18. | " | — | 100/0 | 0.026 | H$_3$PO$_4$ | — | 1 | 26.5$^a$ | 11 |
| *19. | " | — | 95/5 | " | " | — | 1 | 0.6 | 0.2 |
| 20. | " | — | 100/0 | 0.030 | H$_3$PO$_3$ | — | 1 | 23.3$^a$ | 9.8 |
| *21. | " | — | 95/5 | " | " | — | 1 | 0.7 | 0.3 |
| 22. | " | — | 100/0 | 0.025 | (C$_6$H$_5$)$_3$PO$_4$ | — | 1 | 52.8$^a$ | 22.2 |
| 23. | " | — | 95/5 | " | " | — | 1 | 25.6$^b$ | 10.5 |

$^a$For 45.25 hours exposure time (instead of 48 hours).
$^b$For 46.5 hours exposure time (instead of 48 hours).

TABLE II
CORROSION RATE OF SS 304 BY SOLUTIONS OF MIXTURES
OF AN/MA/SSS POLYMER WITH HALOGEN-CONTAINING ORGANIC COMPOUNDS

| | Halogen-Containing Compound | Solvent Mixture | Phosphorus Compound | | No. of Tests | Coupon Weight Loss mg. | Rate in mil./yr. |
|---|---|---|---|---|---|---|---|
| | | | Amount Added mole/kg. polymer | Compound | | | |
| 1. | TBP | DMF/H$_2$O — 100/0 | — | — | 1 | 193.5 | 76.6 |
| 2. | " | " | 0.029 | DPGP | 1 | 142.2 | 56.3 |
| 3. | " | DMF/H$_2$O — 98/2 | — | — | 1 | 124.2 | 49.3 |
| *4. | " | " | 0.029 | DPGP | 1 | 0.6 | 0.2 |
| 5. | ClAH | DMF/H$_2$O — 100/0 | — | — | 1 | 298.2 | 118 |
| 6. | " | " | 0.031 | DPGP | 1 | 286.6 | 113 |
| 7. | " | DMF/H$_2$O — 98/2 | — | — | 1 | 172.0 | 68.1 |
| *8. | " | " | 0.031 | DPGP | 1 | 5.9 | 2.3 |

I claim:

1. In the process of producing flame-resistant filaments by preparing a hot solution of a halogen-containing acrylonitrile polymer composition in an inert organic solvent for the composition, extruding the solution to form filaments and removing the solvent from the filaments; the improvement for reducing corrosive effects of the solution on metallic equipment, as determined at a temperature of 120° C., which comprises incorporating water and a phosphorus compound in the solution, where the phosphorus compound is selected from phosphoric acid, phosphorous acid, and triorgano phosphite compounds consisting of carbon, hydrogen, oxygen and phosphorus, the amount of water being 1 to 10 percent by weight based on the weight of inert organic solvent plus water and the amount of phosphorus compound being 0.005 to 0.1 mole per kilogram of polymer in the composition.

2. The process defined in claim 1 wherein the halogen-containing polymer composition contains at least 40 weight percent of polymerized acrylonitrile monomer units and at least 3 weight percent of halogen bonded to saturated carbon.

3. The process defined in claim 2 wherein the polymer composition comprises polymerized acrylonitrile monomer and polymerized vinyl chloride monomer.

4. The process defined in claim 2 wherein the polymer composition comprises polymerized acrylonitrile monomer and tris(2,3-dibromopropyl)phosphate.

5. The process defined in claim 2 wherein the polymer composition comprises polymerized acrylonitrile monomer and a chlorinated aliphatic hydrocarbon.

6. The process defined in claim 1 wherein the inert organic solvent is dimethylformamide.

7. The process defined in claim 1 wherein the inert organic solvent is dimethylacetamide.

8. The process defined in claim 1 wherein the phosphorus compound is tris-(dipropylene glycol)phosphite.

9. The process defined in claim 1 wherein the phosphorus compound is triisooctyl phosphite.

10. The process defined in claim 1 wherein the phosphorus compound is triphenyl phosphite.

11. The process defined in claim 1 wherein the phosphorus compound is phosphoric acid.

12. The process defined in claim 1 wherein the phosphorus compound is phosphorous acid.

13. The process defined in claim 1 wherein the hot solution is a solution in dimethylformamide comprising about 30 to 42 percent by weight of the halogen-containing acrylonitrile polymer composition, about 0.02 to 0.03 mole of the phosphorus compound per kilogram of polymer in the composition, and about 2 to 5 parts by weight of water per 100 parts of dimethylformamide plus water.

14. The process defined in claim 1 wherein the halogen-containing composition contains at least 10 weight percent of halogen bonded directly to a saturated carbon atom.

* * * * *